United States Patent [19]

Fauck et al.

[11] 4,444,439
[45] Apr. 24, 1984

[54] APPARATUS FOR ADJUSTING A MECHANICALLY-CONTROLLED, LOAD-DEPENDENT BRAKING-POWER REGULATOR

[75] Inventors: Gerhard Fauck, Hanover; Bernd-Joachim Kiel, Wunstorf; Wolfgang Pohl, Garbsen; Helmut Ulrich, Springe, all of Fed. Rep. of Germany

[73] Assignee: WABCO Fahrzeugbremsen GmbH, Hanover, Fed. Rep. of Germany

[21] Appl. No.: 314,825

[22] Filed: Oct. 26, 1981

[30] Foreign Application Priority Data

Nov. 8, 1980 [DE] Fed. Rep. of Germany ....... 3041248

[51] Int. Cl.³ .............................................. B60T 8/22
[52] U.S. Cl. ..................................... 303/22 R; 303/56
[58] Field of Search ................ 303/22 A, 22 R, 23 A, 303/23 R, 56

[56] References Cited

U.S. PATENT DOCUMENTS 3,404,922 10/1968 Valentine ..................... 303/22 R X Primary Examiner—Duane A. Reger
Attorney, Agent, or Firm—R. S. Visk

[57] ABSTRACT

Apparatus for adjusting a mechanically operable load-dependent braking force regulator including a control shaft having a cam surface for setting the axial position of a push rod which controls a valve for supplying brake-operating pressure according to the axial position of said push rod. The axial position of the push rod is set by the cam surface on the control shaft which is rotated through a lever reflecting the actual vehicle load. The regulator may be set at a location away from the vehicle, such as a test rack, then installed on the vehicle. Thus it is not necessary to transport the testing equipment to the vehicle.

6 Claims, 4 Drawing Figures

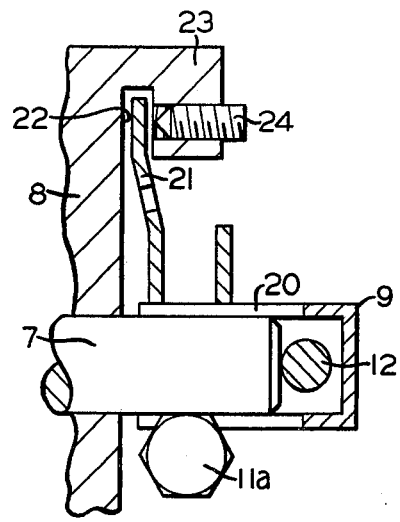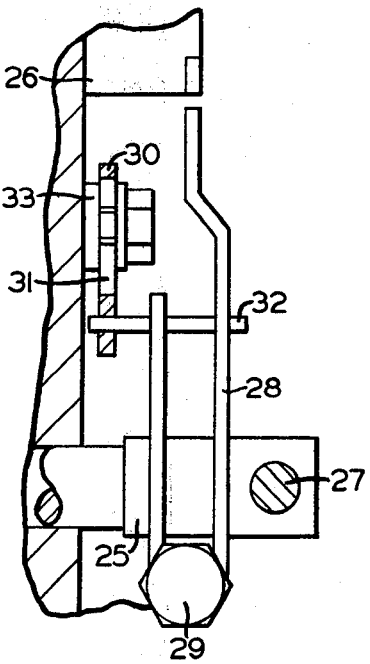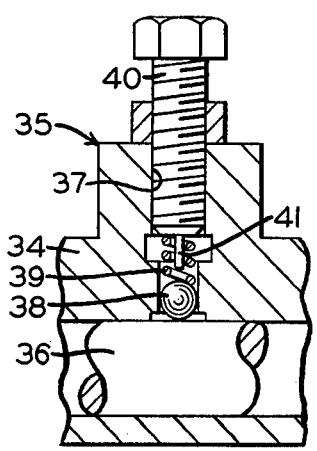

APPARATUS FOR ADJUSTING A MECHANICALLY-CONTROLLED, LOAD-DEPENDENT BRAKING-POWER REGULATOR

BACKGROUND OF THE INVENTION

The invention refers to an apparatus for the adjustment of a mechanically-controlled, load-dependent braking force regulator. Although such braking force regulators are presently known, various unreliable procedures are required for adjustment of such braking force regulators. For example, after the braking force regulator has been installed in the braking equipment of a vehicle, the control shaft of said regulator must first be disconnected from the support means connecting it with the axle of the vehicle, then connected to a test apparatus so that, by means of the control shaft, the desired control value is set on the braking force regulator, and said support means is again connected to the control shaft.

If the braking force regulator is removed for maintenance work, the above-described adjustment process must be repeated when it is reinstalled.

SUMMARY OF THE INVENTION

Since adjustment of the braking force regulator is tedious and difficult when in its installed position on the vehicle, and since the results are not always accurate, the problem addressed by the invention is the improvement of the braking force regulator described above so that adjustment procedures can be carried out before the apparatus is installed in the braking equipment of the vehicle.

The invention is specifically characterized by the fact that the adjustment of the braking force regulator takes place at a different site before the regulator is installed into the brake of a vehicle, so that no test equipment is necessary during and at the installation site. Consequently, a repeated test of the adjustment of the braking force regulator after maintenance on the braking force regulator is not necessary.

BRIEF DESCRIPTION OF THE DRAWINGS

The invention is described in more detail below with reference to the drawings in which:

FIG. 2 is a sectional view of a control shaft portion with a slightly modified clamping device secured thereto;

FIG. 3 shows the portion of the control shaft, as shown in FIG. 2, but with a modified clamping device; and FIG. 4 shows the manner in which the control shaft is mounted in a braking force regulator housing, and modified means for fixing the control shaft in a predetermined position.

DESCRIPTION AND OPERATION

Figure 1:
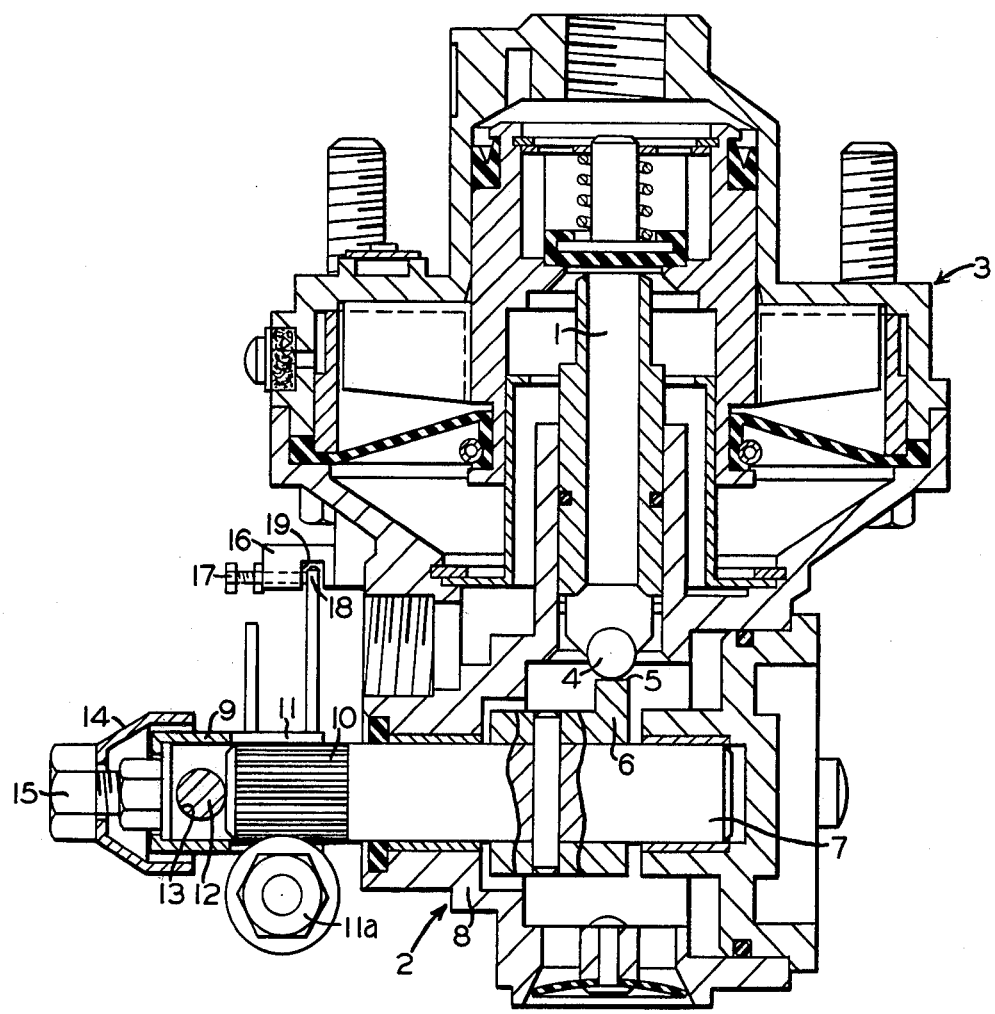
FIG. 1 is an elevational sectional view of a braking force regulator embodying the invention.

Only that much of the braking force regulator shown in FIG. 1 is described as is necessary for an understanding of the invention.

A push rod 1, which in the braking force regulator represents the primary connection between a mechanical control part 2 and a compressed air portion 3, has a lower end 4 slidably engaging a cam surface 5 of a cam 6 fixed on a control shaft 7.

The control shaft 7, normally formed in a single piece, in this instance, is provided, adjacent one end which projects exteriorly of a housing 8 of the braking force regulator, with a tubular portion 9 engageable with a serrated portion 10 forming the end of the control shaft 7 projecting out of housing 8. Tubular portion 9 is torsionally connected with control shaft 7 by means of a clamping ring 11 fixed on said serrated portion of the control shaft by a clamp screw 11a. By releasing the clamping ring 11, angular rotation of the two parts 7 and 9 of the control shaft in relation to one another is possible.

An adjusting lever 12 inserted through a transverse hole 13 formed in tubular portion 9 of control shaft 7 adjacent the serrated end thereof, is linked to a tie rod (not shown), connected with a sprung portion of the vehicle or a metal bellows or air spring on an axle (also not shown) reflecting the deflection due to vehicle load. A cap 14 fastened onto the end face of tubular portion 9 of the control valve by means of a bolt and nut arrangement 15, serves to secure the adjusting lever 12 in place in the hole 13 by tightening the bolt 15.

Housing 8 of the braking force regulator has, in the vicinity of the clamping ring 11, a hook-shaped projection 16 provided with a threaded hole into which is screwed a set screw 17. One side of the clamping ring 11 is provided with an extension 18, which extends into a slot 19 formed in the hook-shaped projection 16. When set screw 17 is screwed into the hook-shaped projection 16, against extension 18, clamping ring 11 is thus secured between the end of screw 17 and the opposite wall of slot 19 to secure said ring in place.

The structure shown in FIG. 2 differs from that shown in FIG. 1 only in that the extension on the clamping ring is slightly altered in shape, as well as the fastening of said extension on the braking force regulator housing.

A clamping ring 20 is mounted by means of the threaded bolt 11a on the control shaft 7 thereby connecting the two open ends of the clamping ring to each other. The clamping ring 20 has on one side thereof an angled extension 21, which projects into a slot 22 formed in a hook-shaped projection 23 extending from the wall of the braking force regulator housing 8. A threaded hole is provided in the hook-shaped projection 23 to receive a set screw 24, by means of which the clamping ring 20 can be set in a predetermined position. The control shaft 7 is connected with the control lever 23, in a manner similar to that discussed in connection with FIG. 1.

The adjustment and setting procedure for the control shaft 7 of the braking force regulator described above is explained below in more detail.

As already mentioned above, the braking force regulator shown in FIG. 1 and described above is preadjusted on a test stand to the control pressure desired for a certain vehicle, and is then installed on the vehicle without further modification. To adjust the braking force regulator to the control pressure required for the type of vehicle in question, the two parts of the control shaft 7 and 9 are torsionally connected to one another, and the adjusting lever 12 is braced by tightening the cover 14 by means of the bolt 15 with the part 9 of the control shaft.

Then adjusting lever 12 is pivoted until it assumes an angle in relation to the braking force regulator housing 8, which should be in contact with the frame or sprung portion of the vehicle, which corresponds, for example, to the "zero" or empty load status of the vehicle. Pivoting of adjusting lever 12 causes rotation of the control shaft 7 relative to the cam surface 5, whereby the working stroke of the push rod 1 in contact with said cam surface is accordingly adjusted so as to effect operation of the compressed air portion 3 of the braking force regulator, as determined by adjustment of the push rod working stroke.

After completion of this adjustment procedure, extension 18 (FIG. 1) and extension 21 (FIG. 2) of clamping rings 9 and 20, are pressed by means of set screws 17 and 24, respectively against the wall of the braking force regulator, and thus the control shaft 7 and the adjusting lever 12 connected with it are secured in the desired position.

After the installation of the braking force regulator on the vehicle, set screw 17 (FIG. 1) or set screw 24 (FIG. 2) is again loosened, so that the control shaft 7 can be adjusted by means of adjusting lever 12 and the housing connected to it and hinged on the vehicle axis, according to the vehicle load.

Set screw 17 is designed so that when the clamping ring 11 is fixed, it leaves a mark on extension 18 of said clamping ring which, for example, makes possible a repeated adjustment of the braking force regulator after maintenance has been performed on the braking force regulator, without the use of test equipment. This is also true of set screw 24.

The structure shown in FIG. 3 differs from that shown in FIGS. 1 and 2 only in the manner in which the clamping ring is secured by rail fastened to the braking force regulator housing for setting the control shaft in a predetermined position.

In the illustration, the portion of a control shaft 25 which projects out of a housing 26 of a braking force regulator with an adjusting lever 27 is shown. On the control shaft 25, a clamping ring 28 is attached by means of a threaded bolt 29 connecting the two arms of the clamping ring 28, so that it cannot rotate. A rail 30 secured on housing 26 and provided with a slot 31, is connected in a releasable manner on one hand with the clamping ring 28 by means of a pin 32 which passes through both the clamping ring 28 and the rail 30, and on the other hand is fastened to the braking force regulator housing 26 by means of a clamp screw 33 through the slot 31 of the rail 30.

To adjust the braking force regulator shown in FIG. 3, the clamp screw 33 is loosened and the pin 32 is removed. By pivoting the adjusting lever 27 and thus producing a corresponding rotation of control shaft 25, the braking force regulator is adjusted to the desired control pressure. Then the rail 30 is pushed into a position in which it covers the hole located in the clamping ring 28 to hold pin 32 in line with the hole in the rail, to thereby make a coupling between the rail 30 and the clamping ring 28 by means of pin 32. Then the rail 30 is set in this position by tightening the clamp screw 33.

The rigid connection obtained in this manner between the control shaft 25, clamping ring 28, rail 30 and the braking force regulator housing 26 guarantees that the adjustment of the braking force regulator cannot be changed during shipping and installation on the vehicle.

After the installation of the braking force regulator on the vehicle, the pin 32 is removed from the support apparatus (clamp screw 33, rail 30, clamping ring 28), so that the control shaft 25 can be rotated by means of the control lever 27 and the housing connected with it and attached to the vehicle, to correspond to the load of the vehicle. If the adjustment of the braking force regulator is to be again checked or even corrected, then all that is necessary is an alignment of the hole located in the clamping ring 28 with the hole provided in the rail 30, which then accepts the pin 32.

FIG. 4 shows yet a different structure for setting the control shaft in a predetermined position in the housing.

A braking force regulator housing 34 exhibits, in the vicinity of the control shaft bearing, a cylindrical fastening mechanism 35 oriented perpendicularly to the axis of a control shaft 36. A graduated bore 37 is formed in housing 34 perpendicularly to control shaft 36 with a ball 38 disposed therein and a compression spring 39 acting on said ball so that the ball is in contact with control shaft 36. Bore 37 is partly provided with threads, into which a threaded pin 40 having an internal punch end 41 is screwed.

The setting apparatus shown in FIG. 4 operates such that, after adjustment of the control shaft 36 has been made, threaded pin 40 is screwed down tightly into bore 37, and thus the ball 38 is pressed against control shaft 36. This process of being pressed against shaft 36 produces a mark thereon which with the spring-loaded ball 38 serves as a slight notch for a check of the adjustment of the control shaft 36.

The compression spring 39 is designed so that the ball, when threaded pin 40 is loosened, is in unpressurized contact with the control shaft 36.

Having thus described the invention, what we claim as new and desire to secure by Letters Patent is:

1. Apparatus for adjusting a mechanically-controlled load-dependent braking force regulator for fluid pressure operable brakes for motor vehicles, said apparatus comprising:
   (a) an axially positionable rod for effecting supply of brake-applying pressure according to the axial position of said rod;
   (b) a control shaft disposed partially within the braking force regulator for effecting adjustment of said rod upon rotational movement of said control shaft, said control shaft having a portion extending outwardly of the braking force regulator;
   (c) an adjusting lever connected to said outwardly extending portion of said control shaft;
   (d) adjusting means for adjusting the position of said adjusting lever in relation to said control shaft;
   (e) referencing means disposed around a portion of said control shaft for identifying a rotational position of said control shaft corresponding to a predetermined setting of the braking force regulator;
   (f) marking means fixedly attached to the braking force regulator for marking said referencing means with an externally perceivable mark.

2. Apparatus according to claim 1, wherein:
   (a) referencing means comprises a clamping device having an extension arm essentially oriented perpendicularly to the axis of the control shaft.

3. Apparatus according to claim 2, wherein the extension arm is designed as a part of removable clamping ring which can be fastened onto the control shaft in surrounding relation thereto.

4. Apparatus according to claim 2, wherein said marking means includes a set screw disposed on a portion of the braking force regulator engageable with said extension arm.

5. Apparatus according to claim 1, wherein said adjusting means includes a tubular portion connected to said control shaft having a transverse opening for receiving one end of said adjusting lever and a cap portion adjustably mounted on said tubular portion such that, when said cap portion is tightened, movement of said adjusting lever due to vehicle load effects rotation of said control shaft a corresponding amount, and when said cap portion is loosened, said adjusting lever moves independent of said control shaft.

6. Apparatus according to claim 1, wherein:

(a) said marking means for setting the control shaft comprises a graduated bore formed in the housing perpendicularly to said control shaft;
(b) a ball disposed in the bottom of said bore in contact with the control shaft;
(c) a compression spring disposed in said bore and acting on said ball for urging the ball against the control shaft; and
(d) a threaded pin screwed into the bore for setting the compression of said spring.

* * * * *